United States Patent [19]
Ball et al.

[11] Patent Number: 6,138,269
[45] Date of Patent: Oct. 24, 2000

[54] DETERMINING THE ACTUAL CLASS OF AN OBJECT AT RUN TIME

[75] Inventors: Michael S. Ball; Soroor Ebnesajjad, both of Palo Alto, Calif.

[73] Assignee: Sun Microsystems, Inc., Palo Alto, Calif.

[21] Appl. No.: 09/082,316

[22] Filed: May 20, 1998

[51] Int. Cl.[7] .................................................. G06F 9/45
[52] U.S. Cl. .................................. 717/2; 717/4; 707/103
[58] Field of Search ................................ 717/1, 2, 4, 5, 717/10; 707/103; 709/315, 316, 331, 332

[56] References Cited

U.S. PATENT DOCUMENTS

| | | | |
|---|---|---|---|
| 5,187,790 | 2/1993 | East et al. | 395/725 |
| 5,297,284 | 3/1994 | Jones et al. | 395/705 |
| 5,307,490 | 4/1994 | Davidson et al. | 395/650 |
| 5,421,012 | 5/1995 | Khoyi et al. | 395/650 |
| 5,437,025 | 7/1995 | Bale et al. | 395/600 |
| 5,437,027 | 7/1995 | Bannon et al. | 395/600 |
| 5,481,721 | 1/1996 | Serlet et al. | 395/700 |
| 5,497,463 | 3/1996 | Stein et al. | 395/200 |
| 5,511,197 | 4/1996 | Hill et al. | 395/700 |
| 5,566,302 | 10/1996 | Khalidi et al. | 395/200 |
| 5,583,988 | 12/1996 | Crank et al. | 714/48 |
| 5,617,569 | 4/1997 | Gray et al. | . |
| 5,793,965 | 8/1998 | Vanderbilt et al. | 395/200.33 |
| 5,872,973 | 2/1999 | Mitchell et al. | 709/305 |
| 5,960,197 | 9/1999 | Segnan | 395/702 |

OTHER PUBLICATIONS

Amitabh Dave, Mohlalefi Sefika and Roy H. Campbell, "*Proxies, Application Interfaces, and Distributed Systems,*" Jan. 1, 1992, Proceedings 2nd International Workshop Object Orientation in Operating Systems, 0–8186–305–9, IEEE, pp. 212–220.

Andrew Birrell, Greg Nelson, Susan Owicki and Edward Wobber, "*Network Objects,*" Dec. 27, 1993, 8283 Operating Systems Review (SIGOPS), No. 5, New York, US pp. 217–230.

Anonymous, "*Distributed Object Activation and Communication Protocols,*" Jul. 1994, IBM Technical Disclosure Bulleting, vol. 37, No. 7, pp. 539–542.

Bob Hathaway, "Comp. Object. FAQ," Nov. 5, 1993, Internet site at www.ihlas.net/new_documents/object_faq.txt, pp. 1–50.

Fernandez, "Simple and effective linnk–time optimization of Modula –3 programs", SIGPLAN'95, ACM, 1995, pp. 103–115.

Hummel et al., A language for conveying the aliasing properties of dynamic, pointer–based data structures, IEEE, 1994, pp. 208–216.

*Primary Examiner*—Kakali Chaki
*Attorney, Agent, or Firm*—Beyer Weaver & Thomas, LLP

[57] ABSTRACT

A dynamic down cast or cross cast is performed at run time within an object-oriented programming language such as C++. The compiler generates data structures during a compile; at run time a routine in the language support library accesses the generated data structures in order to perform the dynamic cast. Class structure information is provided in a size that varies linearly as the total number of classes in the class hierarchy. Cryptographic hashing of class names is used to provide uniqueness. The dynamic cast addresses complications in C++ due to "virtual" and "nonvirtual" inheritance. A run time type identification (RTTI) data structure is created at compile time. An offset within an object description is calculated for each sub-object of the object. Those virtual base classes that are duplicates are skipped producing a data structure that may be searched linearly as the number of classes in the hierarchy. An identifier for each sub-object is stored in the data structure along with its offset. Each virtual table also stores the offset of its corresponding sub-object. A cast operation is performed at run time using the RTTI data structure. The static type object pointer is used to access the object through a particular sub-object. The virtual table associated with the sub-object is used to access the RTTI data structure. The data structure is searched for the target type, and the offset associated with the target type is combined with the offset from the virtual table to adjust the object pointer to cast it to the target type.

17 Claims, 9 Drawing Sheets

DETERMINING THE ACTUAL CLASS OF AN OBJECT AT RUN TIME

FIELD OF THE INVENTION

The present invention relates generally to compilation and execution of a computer language. More specifically, the present invention relates to a method for determining the actual class of an object at run time.

BACKGROUND OF THE INVENTION

In the field of object-oriented programming, data structures known as "objects" that are instances of particular classes (or types) are created, manipulated and deleted during the course of either compilation of or during the execution of an object-oriented program. A given object may have various types associated with it. For example, the class of which the object is an instance is termed the dynamic type. The type of the pointer through which the object is being accessed is called the static type, and the type of a class that the object might inherit from is termed the target type. Typically, target type refers to the class to which the object is being cast, as will be explained below. These different types are useful in describing the manipulation of a particular object.

FIG. 1 illustrates symbolically a prior art class hierarchy tree 10 for classes A1, A2 and B. This example helps illustrate use of terminology for different types. FIG. 1 shows defined classes A1 20, A2 40 and B 30. Class A1 has defined instance variables (known as members in the C++ object-oriented programming language) I 22 and J 24. Also defined are methods (known as member functions in C++) F 26 and G 28. Class B30 has been defined as a subclass (known as a derived class in C++) of class A1. Defined upon class B is instance variable K 32 and methods F, H and Y, respectively 34, 36 and 38. In this example, method F 34 defined upon class B overrides method F 26 that is defined upon class A1. In other words, when objects that are instances of class B call method F, they will be invoking method F 34 that is defined upon class B which may be different from method F 26 defined upon class A I. This ability known as "overloading" to override methods or instance variables in sub-classes is an important feature of object-oriented programming.

For those object-oriented languages that support multiple inheritance, a class A2 40 may be defined that is also a parent class of class B along with class A1. In this example, class A2 defines instance variables M 42 and N 44, along with methods X and Y, 46 and 48, respectively. Method Y 38 defined upon class B overrides method Y 48 defined upon class A2. Thus, class hierarchy 10 defines a class B having parent classes A1 and A2. Objects of class B will inherit all instance variables and methods of classes A1, A2 and class B, with methods F and Y of class B overriding the respective methods of classes A1 and A2.

In such a situation, it often occurs that a pointer of the type A1 points to an object of class B. In this situation, the static type is of type A1, because that is the type of the pointer. However, the dynamic type is of type B, because that is the actual class of the object. If it is desirable to know if the object inherits from any class present in the class hierarchy, then that class which is the potential type of the object is called the target type. However, if an A1 pointer is used to point to an object of class B, then instance variable K and methods H and Y of class B are inaccessible through that A1 pointer. A pointer of type B is necessary to access instance variable K and methods H and Y that are defined upon class B. For example, if an object of class B is pointed to by an A1 pointer, then many object-oriented compilers will not allow a call to method H using an A1 pointer. Thus, it is often desirable to change the type of a pointer.

To remedy this situation, the known technique of "casting" is used. In a specific technique called down-hierarchy casting, or "down casting" (also "narrowing"), the A1 pointer that actually points to an object of class B is converted to a B type of pointer. For example, in the C++ object-oriented programming language, this down cast operation may be written as: B*=dynamic_cast<B*>(A1*). This down cast operation takes the A1 pointer, and if it actually points to an object of class B, then the pointer is converted into a pointer of type B. Down casting is useful primarily to get at methods that are defined in a subclass such as class B, and also to reach additional semantics such as new variables that are defined in a subclass. Also, down casting is used to determine if an object really is of class B; the logic of the program may depend upon it. In other words, if an A1 pointer is being used, it may be useful to know if that A1 pointer is actually pointing to an object of class A1, or to an object of class B. One technique of implementing down casting within the context of a distributed object system is described in commonly-assigned, pending U.S. patent application Ser. No. 08/408,633, filed Mar. 22, 1995, now U.S. Pat. No. 5,793,965, the disclosure of which is incorporated herein by reference.

Another type of cast operation that is useful is a cross-hierarchy cast or "cross cast." A cross cast is useful when multiple inheritance is present in a programming language. In the example of FIG. 1, different sets of variables and methods are defined separately in class A1 and in class A2. Class B, however, inherits both of these sets of functionalities so that any object of class B inherits both as well. If an object of class B is pointed to by an A1 pointer, it may be useful to know whether that object of class B also inherits from class A2. In this cross cast operation, the static type is A1 (because that is the type of the pointer), the dynamic type is B because that is the actual class of the object, and the target type is A2 because that is the class that is the potential parent class of the object of class B. In the cross cast operation, it is determined whether the object of class B does in fact inherit from class A2. If so, then the A1 pointer that points to the class B object is converted into an A2 pointer. A cross cast operation is useful for the same reasons as a down cast, namely to get at functionality within class A2, and because the logic of the program may require knowing from which classes a particular object inherits. In another example, consider another defined class A3 that is not a parent class of class B, and again assume a pointer to an object of class B that is an A1 pointer. A cross cast operation from class A1 to the target type of class A3 would fail because an object of class B does not inherit from class A3.

Thus, in object-oriented languages, it is possible for the actual class of an object to be different from the static type of the reference pointer to that object, and to also be different from the target type desired. At times, the programmer must determine the actual class of the object and may wish to change the static type of the pointer to that object. These cast operations (down cast or cross cast) are also termed run time type identification (RTTI) operations. Examples of RTTI include the "instance_of" operator in the Java programming language and the "dynamic_cast" operator in C++. Such type identification is also described in "Inside the C++ Object Model" by Stanley B. Lippman, Addison Wesley, 1996, and in "The Design and Evolution of C++" by Bjarne Stroustrup, Addison Wesley, 1994, the disclosures of which are incorporated herein by reference. One implementation of type identification used by applicants is described in the document "The C++ Application Binary Interface," the disclosure of which is incorporated herein by reference. However, there are problems associated with these cast operations in object-oriented programming languages.

FIG. 2 illustrates symbolically a prior art object 60 that is an instance of class B 30. Object 60 includes an A1 part 64, an A2 part 66 and a B part 68. Each part of object 60 corresponds to the parent class from which class B inherits, or to class B itself. For example, A1 part 64 includes a virtual pointer 70 to a virtual table 72 that references the methods F and G of class A1. Virtual pointer 70 is also shared with class B in that virtual table 72 also includes references to methods F, H and Y that are defined upon class B. For those functions F and Y of class B that override their corresponding functions in parent classes, virtual table 72 contains a reference to the overriding function of class B. A1 part 64 also includes I variable 74 and J variable 76.

A2 part 66 includes virtual pointer 78 to a virtual table 80 that includes references to the methods defined upon class A2. A separate virtual pointer 78 is used within object 60 because of the multiple inheritance. A2 part 66 also includes instance variables M 82 and N 84. B part 68 includes memory space for instance variable K 86 defined on class B.

Thus, object 60 which is an instance of class B contains a specific part for each of its parent classes (also known as sub-objects). Depending upon which type of pointer is pointing to object 60, it may point to any one of these sub-objects. For example, because B pointer 92 references the complete object 60, it points to the very beginning of object 60. In a similar fashion, A1 pointer 90 points to the beginning of the A1 sub-object 64, which in this case coincides with B pointer 92. A2 pointer 94 points to the beginning of the A2 sub-object 66 within the overall object 60. A dynamic cast operation is performed by adjusting the values of these pointers. For example, performing a down cast from an A2 pointer to a B pointer involves changing the location to which A2 pointer 94 points to the location to which B pointer 92 points. This adjustment of pointers occurs, if, in fact, the down cast or cross cast is successful. And while a downcast from A1 to B does not require a change in the pointers' value, the down cast operation is still useful to check whether the down cast operation is successful (i.e., whether the object is really of type B).

As shown in FIG. 2, multiple inheritance in an object-oriented programming language such as C++ leads to the need for multiple virtual tables. In general, the number of necessary virtual tables corresponds to the number of base classes from which class B might inherit. Another effect on the object model due to multiple inheritance is the need to adjust an object pointer when a function is being called. For example, if A2 pointer 94 is being used to point to object 60 (which really is an instance of class B), but method Y is being called, the A2 pointer needs adjustment. This adjustment is necessary because the method Y defined upon class B has overridden the method Y from class A2. Thus, even though A2 pointer 94 is used to point to object 60, when method Y is called the user expects method Y 38 (defined on class B) to be called, and method Y 38 expects as an implicit argument a pointer to object 60 that is of type B (because method Y 38 is defined upon class B). A variety of techniques exist for converting an A2 pointer in this situation to a B pointer. One technique adds an offset to each virtual table to provide an offset from the original pointer to the correct pointer. Another technique uses a locally generated function called a "thunk" that is used by each virtual table to adjust the object pointer before it calls the desired function. These above techniques adjust the pointer being used to reference an object so that the function being called has the correct type of pointer.

Multiple inheritance in an object-oriented programming language can also lead to other difficulties with cast operations. For example, FIG. 3 illustrates a prior art class hierarchy tree 100 showing a possible class hierarchy in the C++ programming language. In this example, class A 102 and class A1 104 are parent classes for both class B 108 and class C 112. Class A1 106 is also a parent class for class D 110, which in turn is a parent of class C 112. In this style of default inheritance in C++ (termed "nonvirtual"), hierarchy 100 has multiple copies of the same base class A1, namely A1 104 and A1 106. In this example, an object of class C 112 will have a separate sub-object for class A1 104 and a separate sub-object for class A1 106. This type of inheritance is more complicated because more classes must be represented within an object (as sub-objects), and because there is more ambiguity about what "class A1" refers to when there is more than one sub-object named A1 within an object. Cast operations are more difficult because of the multiple sub-objects of the same class; sometimes such a situation should lead to an error.

To further complicate matters, C++ also has an additional inheritance scheme termed "virtual inheritance" (the default inheritance in other languages). In this inheritance scheme, each mention of a class such as A1 only generates one sub-object within an object. In other words, even though class hierarchy 100 may reference class A1 104 and class A1 106, only a single representation of class A1 will be present within an object of type C (in the form of a single A1 sub-object). The occurrence of both of these types of inheritance schemes within the C++ programming language leads to difficult and costly implementations for cast operations. Indeed, other languages with similar inheritance schemes likewise experience costly cast operations.

Another difficulty with cast operations in object-oriented programming languages is the implementation of an inheritance graph used to implement cast operations. For example, C++ uses a directed acyclical graph (DAG) to remedy the difficulties associated with its two kinds of inheritance. In the example of C++, a DAG is built at compile time and is then accessible at run time to help perform cast operations. A tree walking algorithm is used at run time, but this algorithm is recursive and varies exponentially as the square of the depth of the class hierarchy tree. Accordingly, the algorithm is complex and expensive, resulting in a very slow implementation. Furthermore, such an algorithm used with a DAG generates an extremely large data structure that takes up enormous space in memory. Furthermore, only one DAG is typically created for class C 112. However, with the shared libraries in use in modern programming, it can be extremely complex and expensive to implement cast operations in these situations. Aside from C++, other object-oriented programming languages that use costly inheritance graphs are Eiffel and Common Lisp Object System (CLOS).

Therefore, it would be desirable to have a technique for executing cast operations that determines not only if it is a legal cast operation, but also how much an object pointer must be adjusted to access the correct sub-object within an object. It would further be desirable for such a technique to improve upon the DAGs and similar techniques used in object-oriented languages for implementing cast operations.

SUMMARY OF THE INVENTION

To achieve the foregoing, and in accordance with the purpose of the present invention, dynamic cast techniques are disclosed that performs a down cast or cross cast simply and efficiently within an object-oriented programming language.

In one aspect of the invention, the dynamic cast technique is embodied within an object-oriented compiler and run time system. The compiler generates data structures during a compile, while at run time a routine in the language support library is called to access the generated data structures to perform the dynamic cast. The present invention provides class structure information in a size that varies linearly as the total number of classes in the class hierarchy to reduce the time necessary to perform a cast operation. Also, cryptographic hashing of class names is used to provide uniqueness in another aspect of the invention. Efficient algorithms are provided for modifying pointers to point to different sub-objects of an object to perform a cast operation.

The dynamic cast technique of the present invention addresses the complications in C++ due to the two kinds of inheritance in that language. The present invention more quickly and more simply performs cast operations than the directed acyclical graph (DAG) of C++. The present invention is useful not only to an object-oriented language such as C++, but to any object-oriented language that implements cast operations that are either too complex or too slow. In particular, the present invention is applicable to other object-oriented programming language such as Eiffel, Java, and CLOS.

In one specific embodiment, a run time type identification (RTTI) data structure is created at compile time and linked to each object description. An offset within the object description is calculated for each sub-object of the object. Those virtual base classes that are duplicates of virtual base classes already encountered are skipped, thereby producing a data structure that may be searched using an algorithm that varies linearly with the number of classes in the hierarchy. A unique identifier for each sub-object is stored in the RTTI data structure along with its offset. Each virtual table of the object description also stores the offset of its corresponding sub-object.

In another specific embodiment, a cast operation is performed at run time using the RTTI data structure. The static type object pointer is used to access the object through a particular sub-object. The virtual table associated with the sub-object is used to access the RTTI data structure. The data structure is searched for the target type, and the offset associated with the target type is combined with the offset from the virtual table to adjust the object pointer to cast it to the target type. Thus, the storage and use of these offsets provides for a more rapid cast operation.

In specific embodiments, the down cast operation is performed specifically for the case in C++ (or similar language) where the static type of the object is a nonvirtual base class, or for the case where the static type of the object is a virtual base class. By using the generated RTTI data structure, an efficient run time cast operation correctly casts from the static type to the target type in a time that varies linearly with the number of classes in the class hierarchy for the object, even when both nonvirtual and virtual inheritance is used.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

The present invention generates a run time type identification (RTTI) data structure for each appropriate class within a program at compile time, and then accesses this RTTI data structure during run time to assist with a cast operation such as a down cast or a cross cast.

Figure 1:
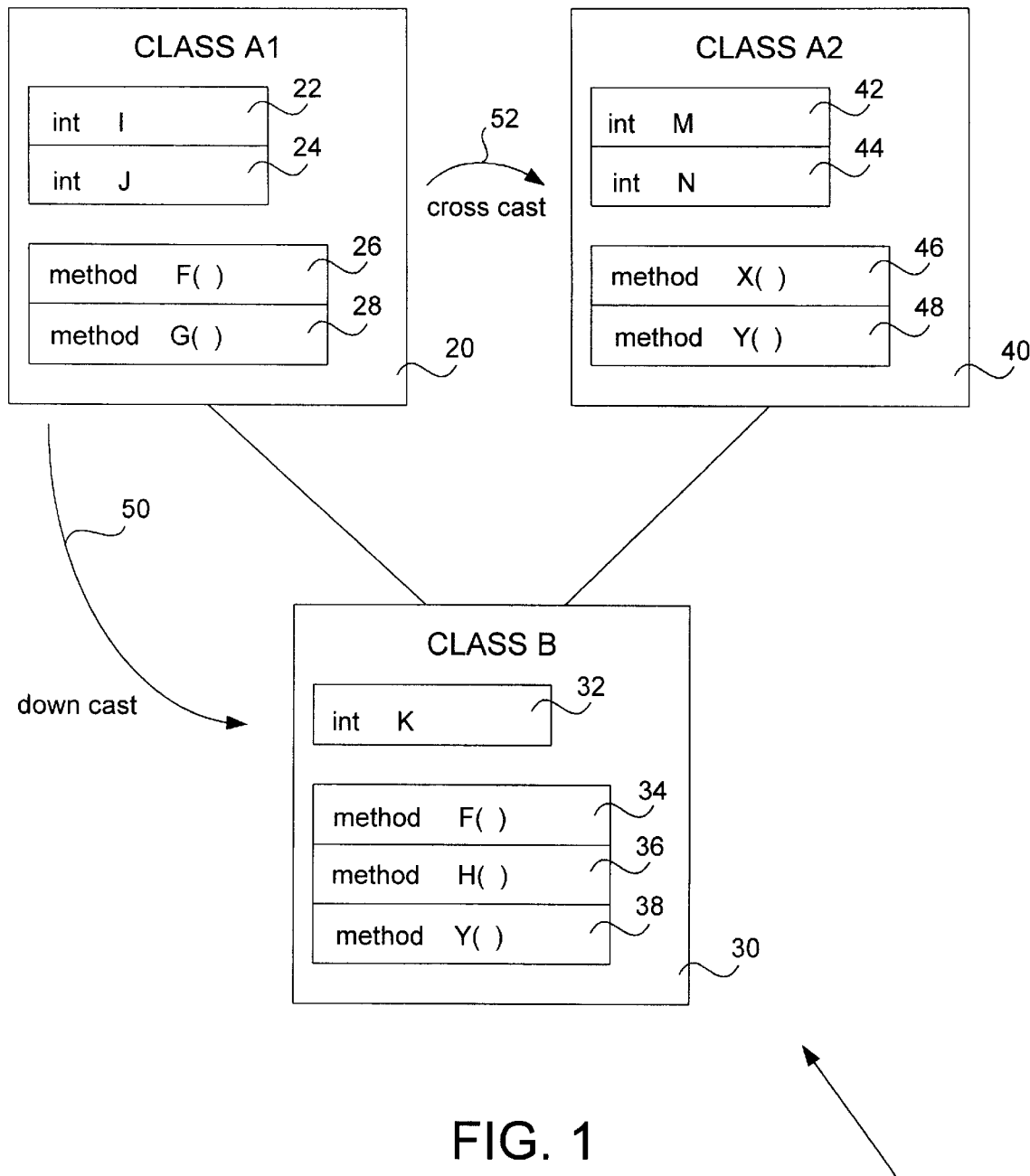
FIG. 1 illustrates symbolically a prior art class hierarchy tree for classes A1, A2 and B.
Figure 2:
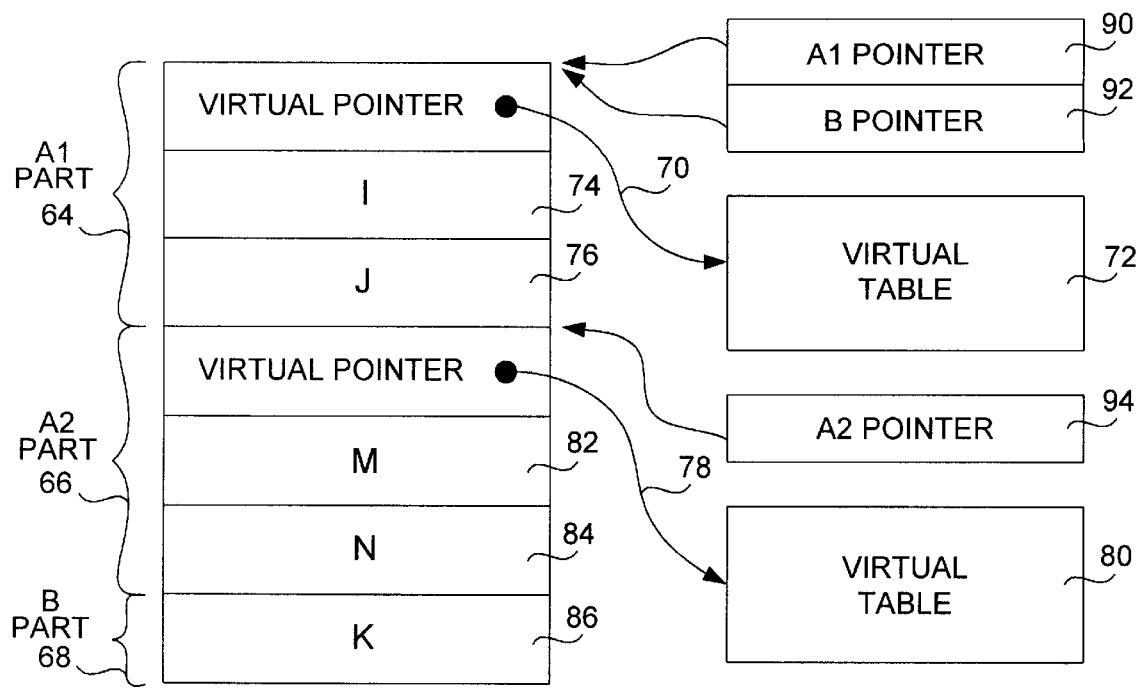
FIG. 2 illustrates symbolically a prior art object that is an instance of class B.
Figure 4:
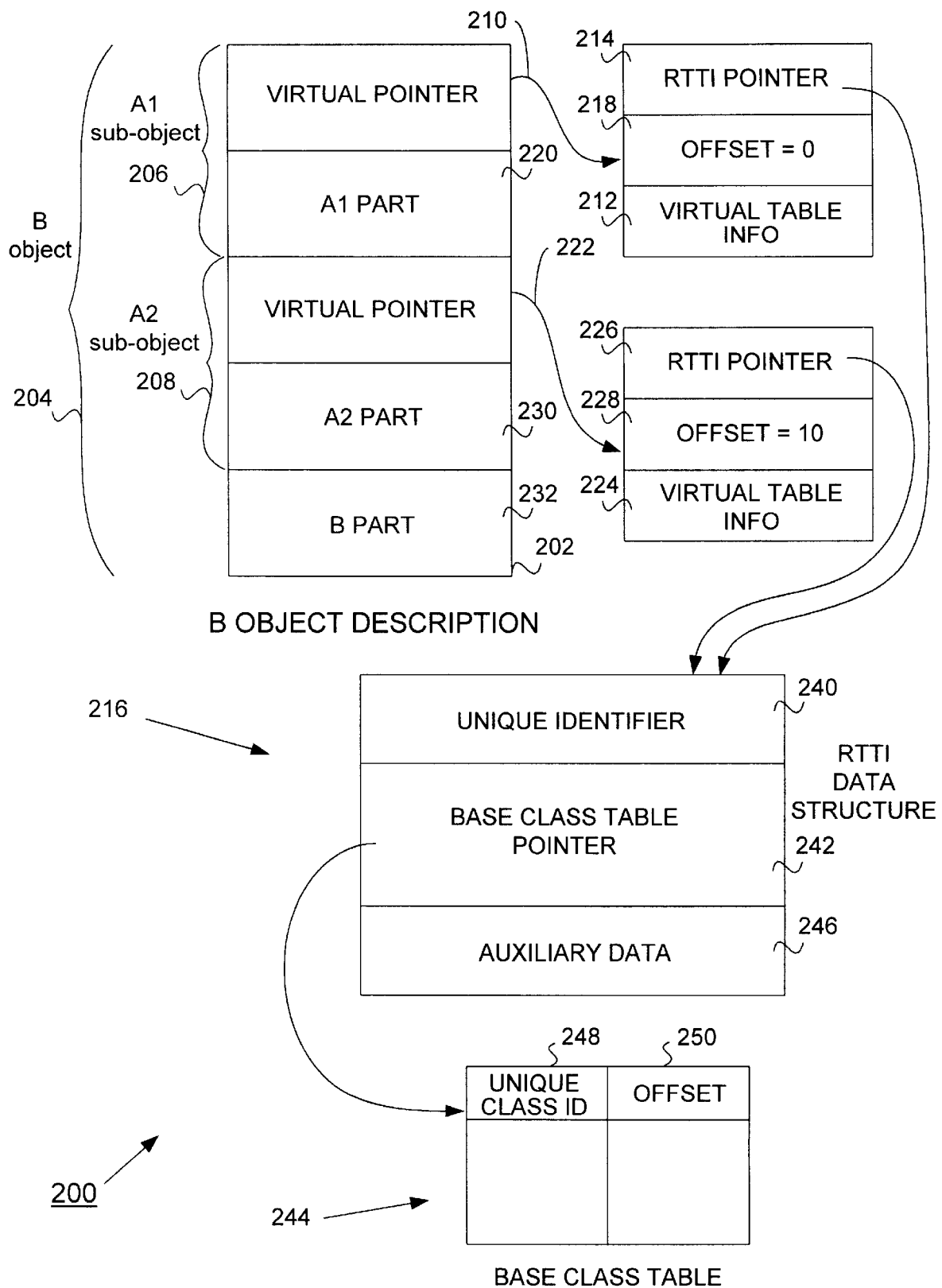
FIG. 4 illustrates symbolically an object description and data structure useful for performing cast operations according to an embodiment of the present invention.

FIG. 4 illustrates symbolically an object description and data structures 200 useful for performing cast operations according to one embodiment of the present invention. Generation and use of these data structures are further described in FIGS. 5–9. Object description 202 is a complete description for an object that is an instance of a class B such as is shown in FIGS. 1 and 2. Such a complete object description, or that of an instance, is produced by the compiler. The complete object description for an instance of class B includes the B object 204 that encompasses the complete object, the A1 sub-object 206 and the A2 sub-object 208.

A1 sub-object 206 includes a virtual pointer 210 pointing to a virtual table 212 that is shared with B object 204. Virtual table 212 includes a real time type identification (RTTI) pointer 214 that references an RTTI data structure 216. Also included is an offset 218 and other information in the virtual table that will be appreciated by those of skill in the art. In this example, offset 218 has a value of zero because both the A1 sub-object and the B object begin at the beginning of the complete object description for this object. A1 sub-object 206 also includes its A1 part 220 that includes instance variables, etc.

A2 sub-object 208 includes a virtual pointer 222 that points to virtual table 224. Included within virtual table 224 is RTTI pointer 226 that also references RTTI data structure 216. Also included is an offset 228 that indicates the offset of the A2 sub-object 208 from the beginning of the object description 202. In this example, offset 228 has a value of 10 because that is the distance of the A2 sub-object from the beginning of the complete object. Also included within A2 sub-object 208 is an A2 part 230 that includes instance variables, etc., associated with the A2 class. B part 232 is also included within B object 204 and includes instance variables, etc., defined upon the B class.

RTTI data structure 216 includes a unique identifier 240, a base class table pointer 242 that points to a base class table 244, and auxiliary data 246. Base class table 244 stores information regarding each of the base classes for the object, and includes a unique class identifier 248 each of which is associated with an offset 250 indicating the offset of the sub-object corresponding to that class identifier within object description 202.

GENERATE DATA STRUCTURES

Figure 5:
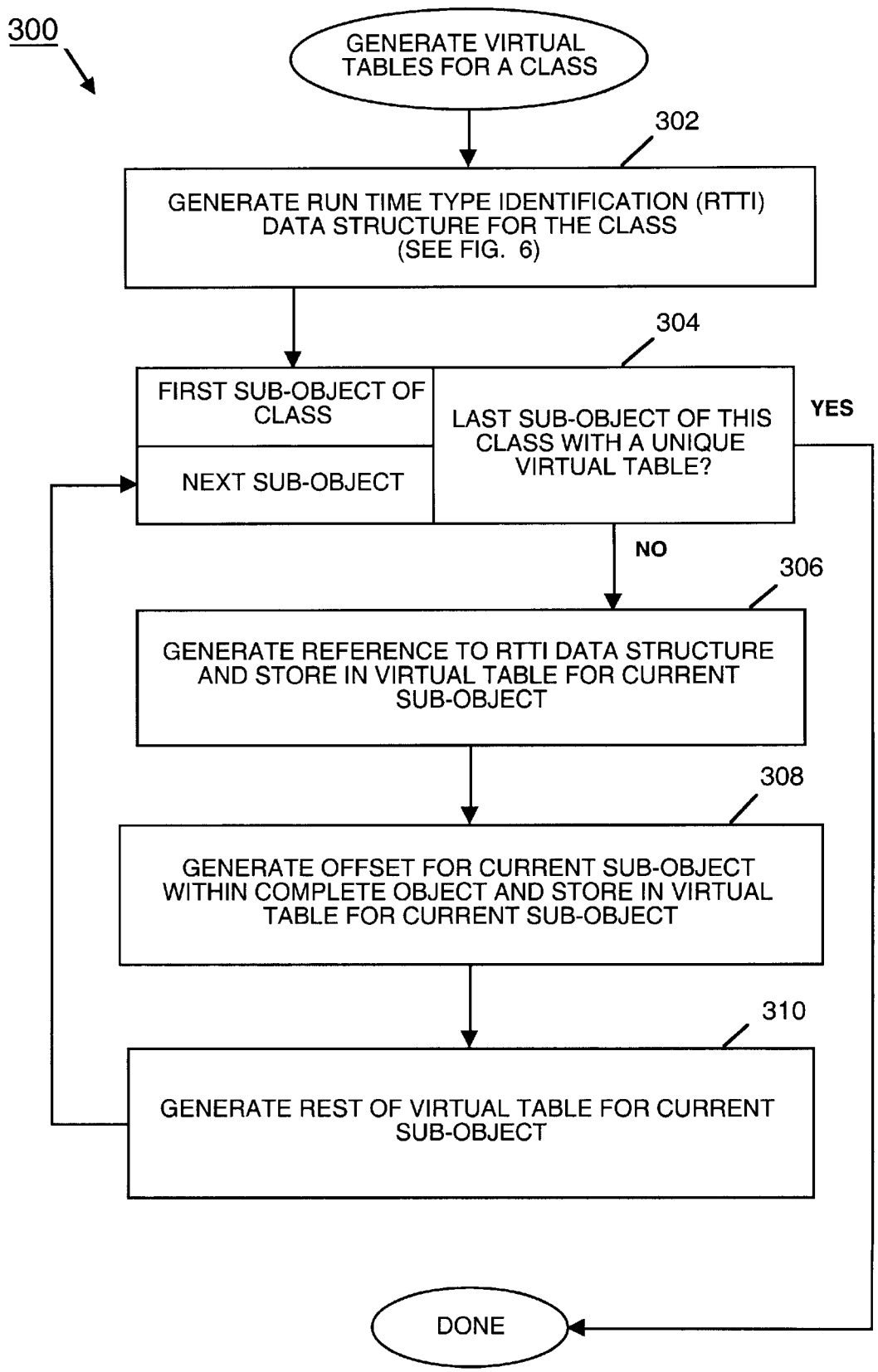
FIG. 5 is a flowchart describing one embodiment of the present invention for generating virtual tables for a particular class at compile time.

FIG. 5 is a flowchart 300 describing one embodiment of the present invention for generating virtual tables for a particular class at compile time. Each class has an associated object description (or "instance map") that describes how objects of that class are structured, what sub-objects they have, to which virtual tables they point, with which RTTI data structures they are associated, etc. Flowchart 300 assists in generating some of this information for an object description at compile time. In a preferred embodiment, flowchart 300 is performed for each class within a program for which there is a need to generate virtual tables.

Step 302 generates a run time type identification (RTTI) data structure 216 for the class as explained below in FIG. 6. This RTTI data structure generated at compile time will be used during run time to assist in a cast operation. Step 304 is a looping construct that loops through each sub-object of the class that has its own virtual pointer, and hence its own virtual table. Certain sub-objects within an object may not be associated with their own unique virtual table because they share a virtual table. Although specific instances of a class are generally not created until run time, a complete description of potential instances for a class is created during compile time, and steps 304–310 assist in the generation of a virtual table for a particular sub-object according to an embodiment of the present invention. Once a virtual table has been generated for the last sub-object of the class the flowchart ends.

Step 306 generates a reference to the RTTI data structure generated above and stores the reference in the virtual table for the current sub-object. In a preferred embodiment, this reference is a pointer to the RTTI data structure stored in a known location in the virtual table. For example, virtual table 212 has pointer 214 to RTTI structure 216. Step 308 generates an offset for the current sub-object within the complete object and stores this offset in the virtual table for the current sub-object. Using the example of FIG. 4, the offset for the virtual table associated with both the A1 sub-object and the B object would have a value of zero because the pointers for each of these sub-objects are at the beginning of the complete object for the B object. On the other hand, an offset for the A2 sub-object would have a positive value because a pointer to the A2 sub-object is located at some distance (or offset) within the complete B object. In a preferred embodiment, this offset is stored at a known location within the virtual table. For example, virtual table 224 shows an offset of 10 for the A2 sub-object.

Step 310 generates the rest of the virtual table for the current sub-object using techniques that will be appreciated by those of skill in the art. Once the virtual table for this sub-object has been created, control returns to step 304 where the next sub-object is selected.

Figure 6:
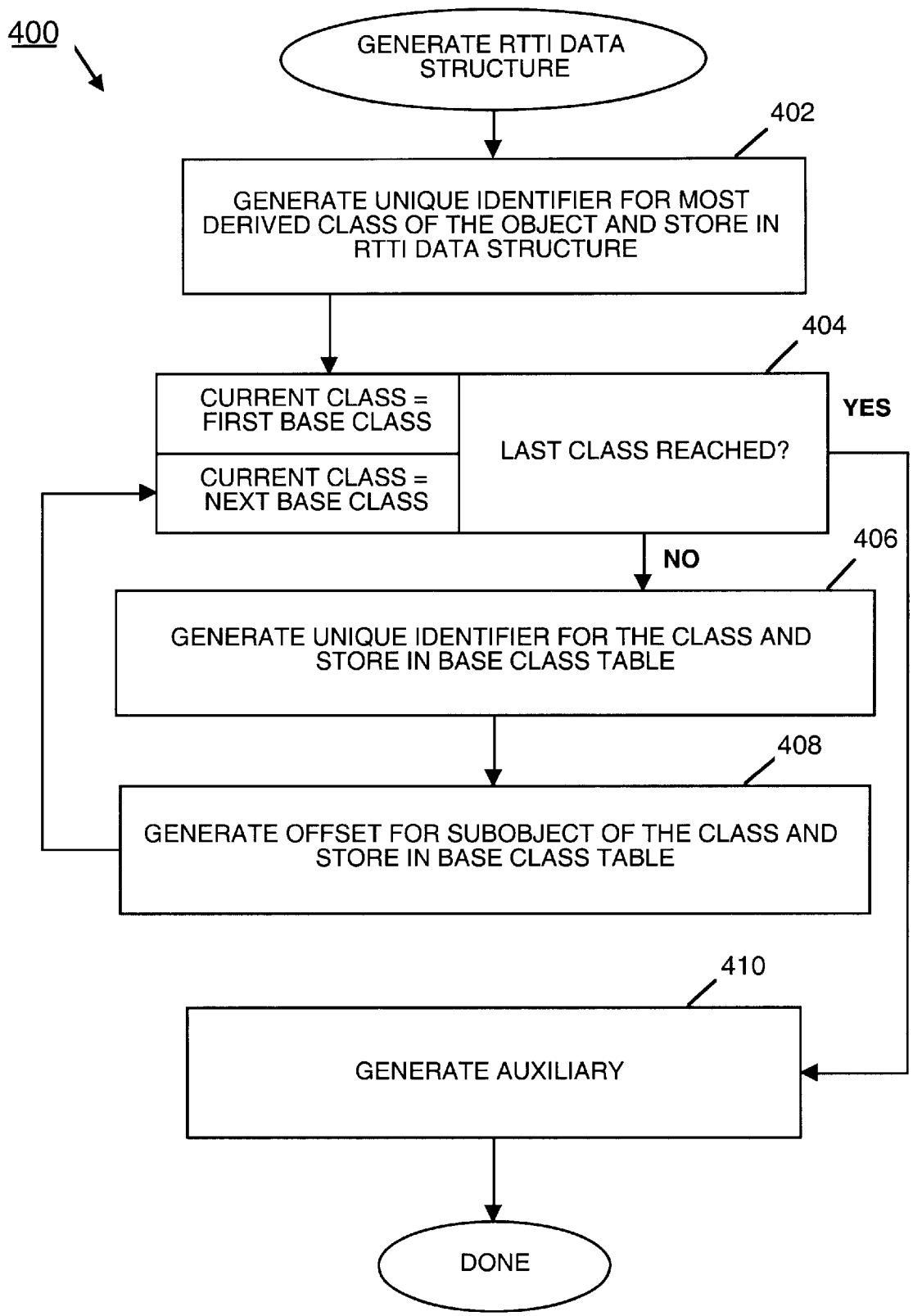
FIG. 6 is a flowchart describing one embodiment of a technique for generating an RTTI data structure.

FIG. 6 is a flowchart 400 describing one embodiment of a technique for generating an RTTI data structure in accordance with step 302 of FIG. 5. An RTTI data structure and associated pointers are generated for a particular class for which virtual tables are created in FIG. 5. This RTTI data structure will be associated with the complete object description (or "instance map") for the class in question. For example, FIG. 4 shows an object description 202 for a class B that is derived from classes A1 and A2. In this example, class B is termed the most derived class.

Step 402 generates a unique identifier for the most derived class of the object in question and stores this unique identifier in a newly created RTTI data structure. For example, FIG. 4 shows a unique identifier 240 included within an RTTI data structure 216. A wide variety of techniques may be used to generate a unique identifier for a class. In a preferred embodiment of the invention, a cryptographic hashing technique is used to generate such an identifier. The cryptographic hashing technique preferably has a very small collision probability.

Steps 404–408 generate a base class table 244 to be associated with the RTTI structure 216. A base class table may be created and associated with an RTTI data structure in a wide variety of manners. By way of example, a base class table pointer 242 may be used to point to base class table 244 outside data structure 216. In another embodiment, the base class table may be located within data structure 216 in which case the length of the table is stored at its beginning, or some other suitable method is used for determining the length of the table. Step 404 is a looping construct that steps through all of the base classes in the class hierarchy for the most derived class including the most derived class. In other words, each of the sub-objects within the object description are analyzed in turn. In the example of FIG. 4, each of the sub-objects A1 and A2, as well as the B object are analyzed in turn. Preferably, the most derived classes are visited after their base classes. Most preferably a depth first, left-to-right order traversal of the class hierarchy is used. Once the last sub-object has been analyzed, then step 404 transfers control to step 410.

In a preferred embodiment of the invention for use with a compiler for the C++ programming language, when a virtual base class is reached in the class hierarchy traversal of step 404, the virtual base class is skipped if it has already been encountered. In other words, if a unique identifier and an offset have already been identified for this virtual base class, then any subsequent occurrences of that virtual base class in the class hierarchy are ignored. This implementation avoids producing a tree walking algorithm that varies quadratically with the number of nodes in the tree (i.e., a linear algorithm is produced).

Step 406 generates a unique identifier for the class in question and stores this unique identifier in base class table 244 in field 248. In a preferred embodiment of the invention, the unique identifier generated in step 406 also uses a cryptographic hashing function and generates the same unique identifier for the derived class as might be generated above in step 402. Of course, other techniques for generating identifiers may also be used. Also, once a unique identifier has been generated for a class, it need not be generated again, but could be stored for later reference.

Step 408 generates an offset for the sub-object in question and stores this offset in offset field 250 in association with the unique identifier generated in step 406. In the example of FIG. 4, once a unique identifier has been generated for sub-object A1 206, then an offset of zero is stored in the base class table in association therewith, because the A1 sub-object is located at the beginning of the complete B object. In a similar fashion, once a unique identifier has been generated for the A2 sub-object 208, its offset of 10 from the beginning of the B object is stored therewith in base class table 244. Once step 408 is complete, the next base class in the class hierarchy is processed in step 404 and execution continues as above.

Once steps 404–408 have completed, step 410 generates any auxiliary data needed for special processing and stores this data in auxiliary data field 246 of RTTI data structure 216. This data includes any information unique to the language being used including text of names, additional types, etc., and will be appreciated by those of skill in the art. Once step 410 is complete, then the flowchart ends. Once FIGS. 5 and 6 have been completed, the RTTI data structures needed for the appropriate classes are in place and are ready to assist a cast operation during run time.

CAST OPERATIONS AT RUN TIME

Figure 7:
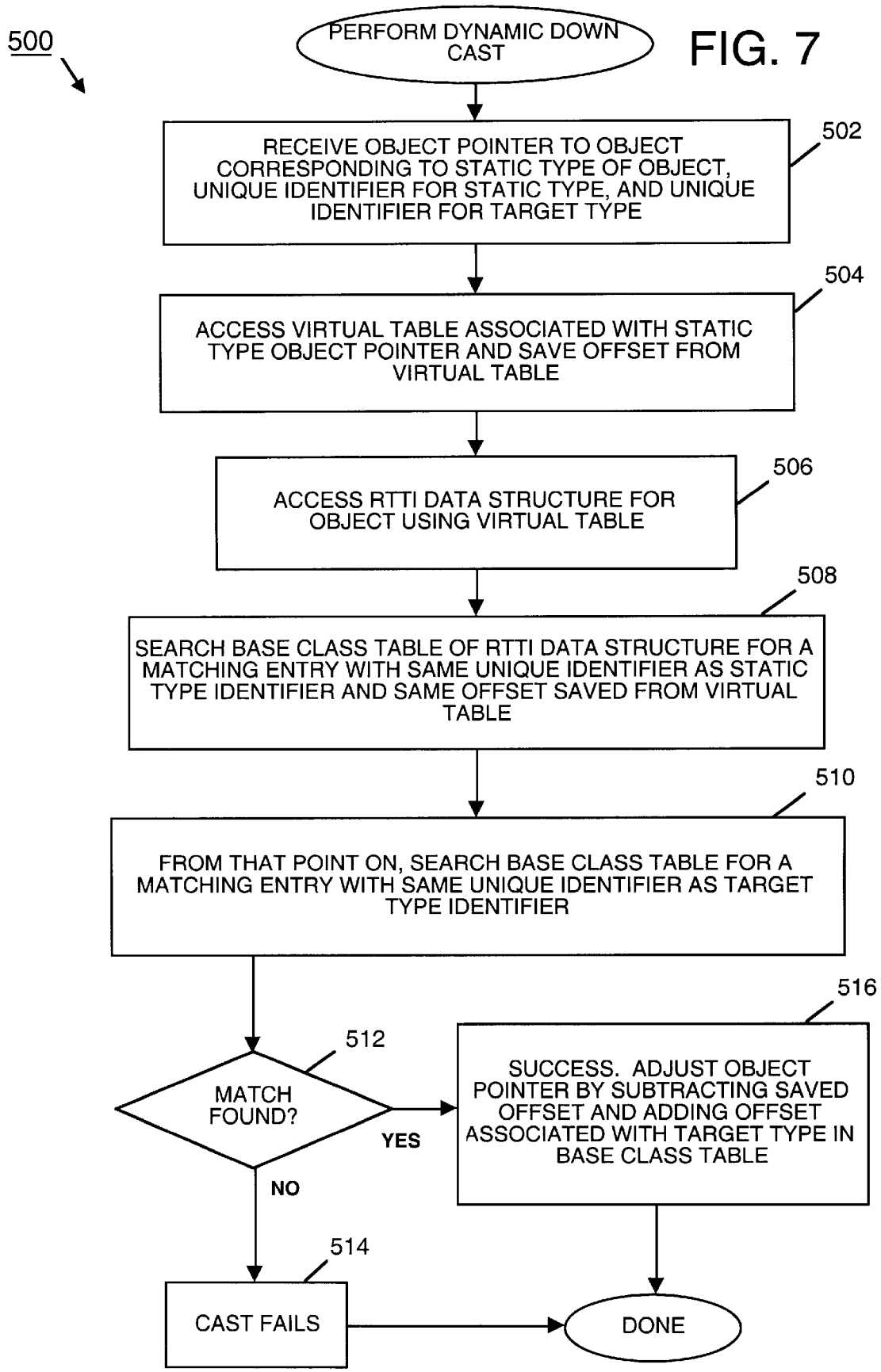
FIG. 7 is a flowchart describing one embodiment for performing a dynamic down cast at run time.
Figure 8:
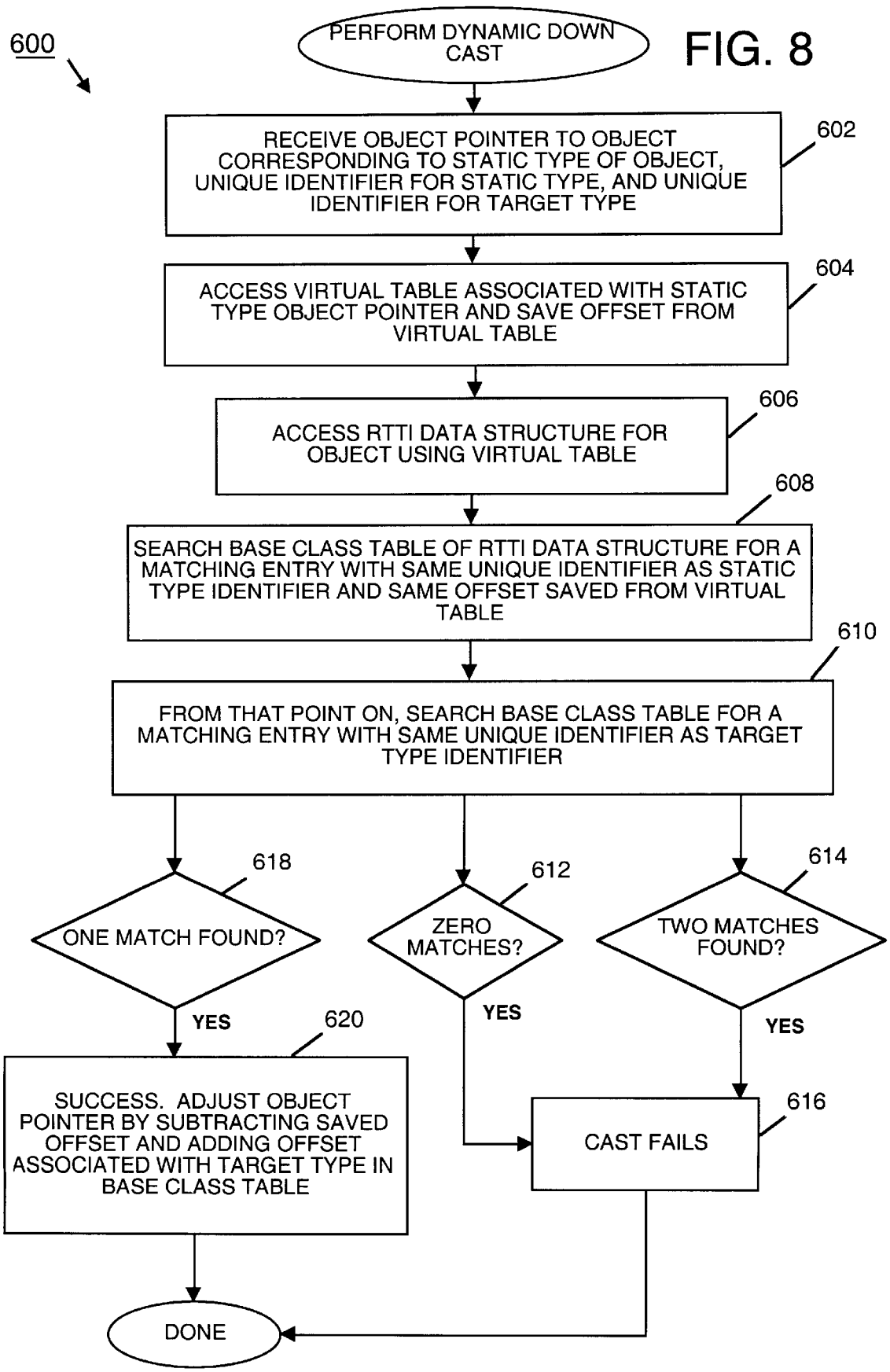
FIG. 8 is a flowchart describing another technique for performing a down cast.
Figure 9:
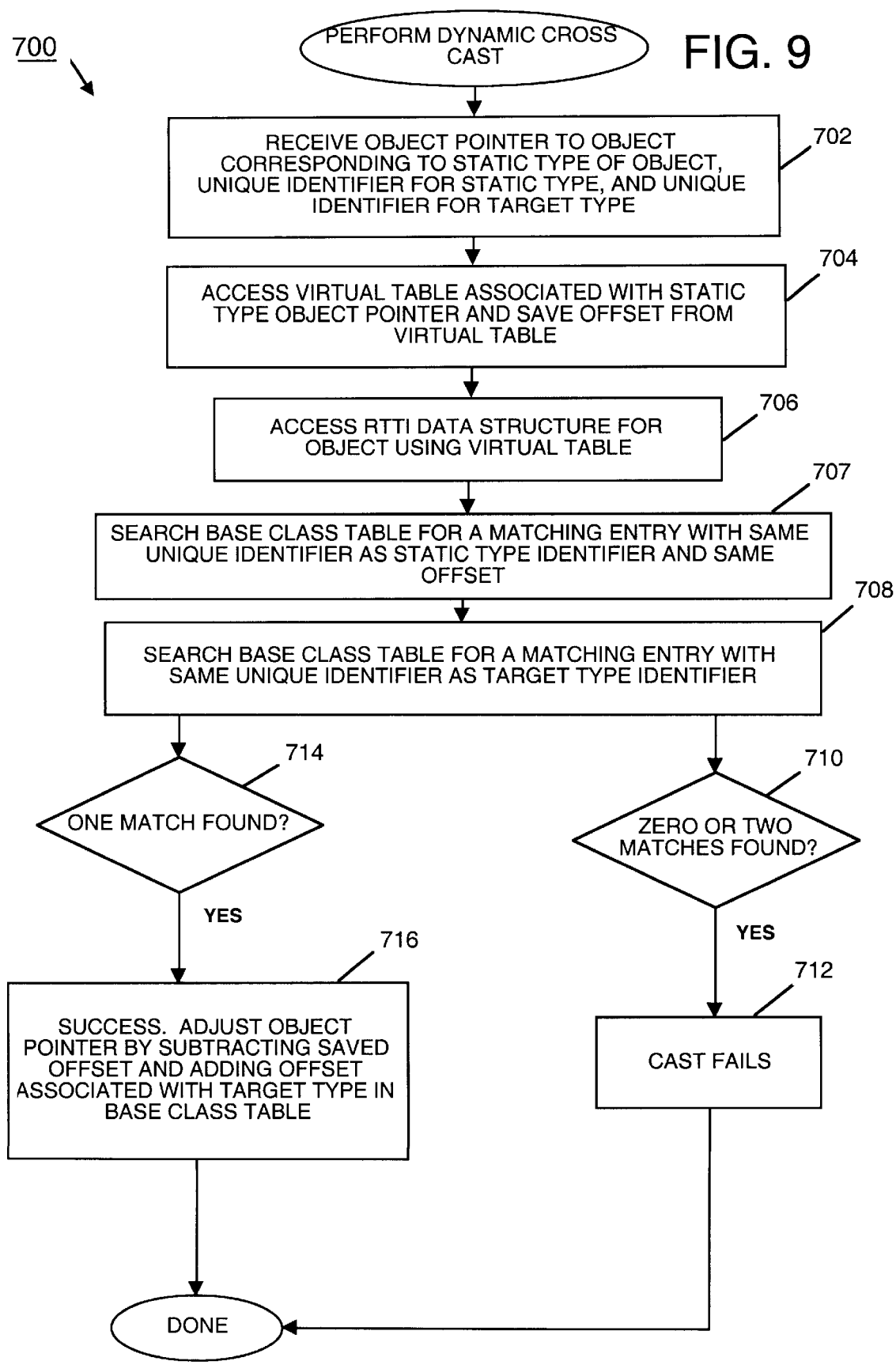
FIG. 9 is a flowchart describing a technique for performing a cross-cast.

FIGS. 7 and 8 illustrate techniques for performing a down cast, while FIG. 9 illustrates a technique for performing a cross cast. Each of these cast operations receives a variety of parameters. In a preferred embodiment of the invention, each cast operation receives as parameters an object pointer that points to the object in question, a pointer to the RTTI data structure for the class corresponding to the static type of the object in question, and a pointer to the RTTI data structure for the class corresponding to the target type of the object in question. Of course, variations on these parameters may also be provided. The pointers to the static and target type RTTI data structures are used to provide the unique identifier for the class corresponding to the static type of the object and the target type of the object, respectively. These unique identifiers for the static type and the target type may be passed in individually through the cast operation, or may be included in an RTTI data structure to which a pointer is supplied. FIGS. 7–9 are described in this embodiment as three separate flowcharts, however, they may also be practiced together and embodied in one or two flowcharts with the appropriate conditional statements provided.

DOWN CAST WITH NONVIRTUAL INHERITANCE

FIG. 7 is a flowchart 500 describing one embodiment of how a dynamic down cast is performed at run time. Flowchart 500 is useful where an inheritance scheme is used that creates a separate sub-object within an object for each occurrence of a particular class in the inheritance tree for the object. In other words, if object B inherits from two different references to class A in the inheritance tree, there would be two different sub-objects for class A within object B. In the C++ programming language, this scheme is the default inheritance scheme, or "nonvirtual" inheritance. Flowchart 500 is also suitable for any similar programming language having classes that correspond to the "nonvirtual" classes of C++. In particular, flowchart 500 handles the situation where the static type of the object in question is a nonvirtual base class of the target type; i.e., there may exist multiple sub-objects of this static type within the object. Thus flowchart 500 applies when the static type is a nonvirtual base class, but is also suitable for use if "virtual" inheritance is used elsewhere within the same class hierarchy.

Step 502 receives parameters for this dynamic down cast operation by receiving an object pointer having a type corresponding to the static type of the object, a unique identifier for the static type, and a unique identifier for the target type. In one embodiment of the invention, the unique identifiers for the static and target types are accessed through pointers to the respective RTTI data structures for these types. Step 504 accesses the virtual table associated with the static type object pointer and saves the offset from that virtual table for later use. Using the example of FIG. 4, if B Object 204 is referenced through an A2 object pointer that points to the beginning of the A2 sub-object 208 (that is, the static type is A2), then virtual table 224 is accessed in step 504 and offset 228 (having a value of 10) is saved for later use.

Step 506 accesses the RTTI data structure associated with the object by using the virtual table. Continuing with the example above, if B object 204 is accessed via an A2 pointer, then RTTI pointer 226 of virtual table 224 is used to reference RTTI data structure 216.

Figure 3:
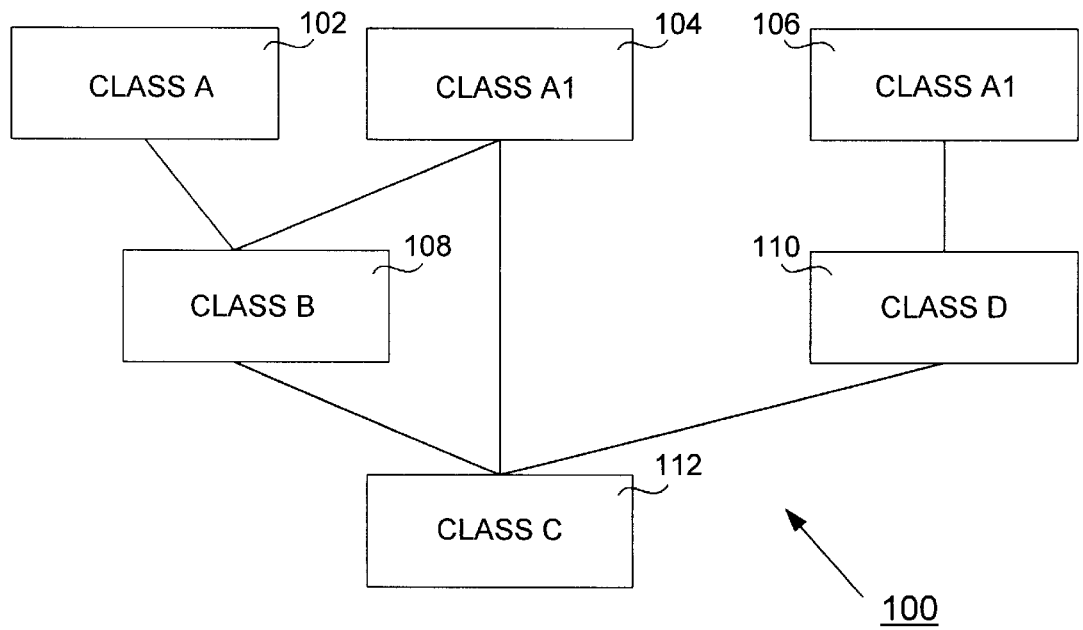
FIG. 3 illustrates a prior art class hierarchy tree showing a possible hierarchy in the C++ programming language.

Step 508 searches the base class table of the RTTI data structure looking for an entry that matches the unique identifier of the static type identifier received in step 502 and that also matches the offset saved from the virtual table in step 504. In nonvirtual inheritance there may be many sub-objects within an object of the same class. This step searches for the sub-object that matches the sub-object to which the object pointer points. In the course of this search, it may be necessary to skip over entries in the base class table having a matching identifier for the static type but that do not have a matching offset. This would occur when there are multiple sub-objects within the object all being of the same static type. For example, FIG. 3 shows class A1 104 and class A1 106. A down cast from one A1 to class C would need to distinguish between the two A1s. Skipping entries without a matching offset performs this function. Because all of the sub-objects of the object in question have already been stored in the base class table, step 508 should always succeed.

Step 510 continues searching through the base class table from the point reached in step 508 for an entry that matches the unique identifier of the target type received in step 502. Having the base class table ordered based upon a depth-first left-to-right traversal of the class hierarchy (steps 404–408) is advantageous for matching the unique identifier of the target type. In step 512 if a match is not found then the cast fails in step 514 and an appropriate indication is returned to the cast operation. A cast would fail in this situation because since the target type was not found in the base class table, indicating that the target type is not a derived class of the static type, and therefore the down cast should fail.

However, if a match is found in step 512 then the down cast is a success. Step 516 converts the static type object pointer into an object pointer of the target type by subtracting the saved offset from the original object pointer and then adding the offset associated with the target type in the base class table. For example, using the example of FIG. 4, if the pointer is of type A2 and the target type is of class B, then the saved offset has a value of 10 and the offset associated with the target type (which in this case is of class B) has a value of zero. Subtracting the saved offset from the object pointer produces the beginning of the B object, which when added to the offset zero of the target type yields a pointer pointing to the beginning of the B object. This B object pointer is the desired result. Use of offsets in this way provides for a simple and efficient algorithm.

DOWN CAST WITH VIRTUAL INHERITANCE

FIG. 8 is a flowchart 600 for performing a second embodiment of a down cast operation. Flowchart 600 is useful in a programming language when an inheritance schemes is used where a given class in a class hierarchy is at most represented by one sub-object within an object of a derived class. In C++, this inheritance scheme is termed "virtual inheritance". In other programming languages, this scheme is the default inheritance. In particular, flowchart 600 handles the situation where the static type of the object in question is a virtual base class of the target type; i.e., there will be only one sub-objects of this static type within the object. Thus flowchart 600 applies when the static type is a virtual base class, but is also suitable for use if nonvirtual inheritance is used elsewhere within the same class hierarchy.

Step 602 receives parameters for this dynamic down cast operation by receiving an object pointer having a type corresponding to the static type of the object, a unique identifier for the static type, and a unique identifier for the target type. In one embodiment of the invention, the unique identifiers for the static and target types are accessed through pointers to the respective RTTI data structures for these types. Step 604 accesses the virtual table associated with the static type object pointer and saves the offset from that virtual table for later use. Using the example of FIG. 4, if B Object 204 is referenced through an A2 object pointer that points to the beginning of the A2 sub-object 208 (that is, the static type is A2), then virtual table 224 is accessed in step 604 and offset 228 (having a value of 10) is saved for later use.

Step 606 accesses the RTTI data structure associated with the object by using the virtual table. Continuing with the example above, if B object 204 is accessed via an A2 pointer, then RTTI pointer 226 of virtual table 224 is used to reference RTTI data structure 216.

Step 608 searches the base class table of the RTTI data structure looking for an entry that matches the unique identifier of the static type identifier received in step 602 and that also matches the offset saved from the virtual table in step 604. In "nonvirtual" inheritance there may be many sub-objects within an object of the same class. This step searches for the sub-object that matches the sub-object to which the object pointer points. In the course of this search, it may be necessary to skip over entries in the base class table having a matching identifier for the static type but that do not have a matching offset. This would occur when there are multiple sub-objects within the objects all being of the same static type. Because all of the sub-objects of the object in question have already been stored in the base class table, step 608 should always succeed.

Step 610 continues searching through the base class table from the point reached in step 608 for an entry that matches the unique identifier of the target type received in step 602. In step 612, if zero matches are found for the target type identifier in the base class table then the down cast fails in step 616. An appropriate indication is returned, and the flowchart ends. If a first match for the target identifier is found in the base class table then the search continues from that point through the base class table. If a second match is found for the target type identifier in step 614, then the cast fails in step 616, an appropriate indication is returned and the flowchart ends. If two matches are found in step 614 this indicates that there may be more than one parent class of the object in question having the same name; this ambiguity cannot be resolved so the cast fails. This situation occurs especially in C++ because of nonvirtual inheritance. This situation may occur in other programming languages having similar ambiguities.

If only one match is found for the target type identifier in the base class table in step 618 then the cast operation is a success. The search through the base class table after one match for the target type identifier has been found may also encounter a match with the static type identifier or no other match at all; however, the cast succeeds nonetheless. Step 620 completes the downcast operation by subtracting the saved offset from the input object pointer and adding the offset associated with the target type from the base class table. In this fashion, the down cast operation is performed by adjusting the object pointer using the offset from the virtual table and an offset stored in the base class table. Again, use of offsets in this way provides for a simple and efficient algorithm.

CROSS CAST OPERATION

FIG. 9 is a flowchart 700 describing one embodiment for performing a dynamic cross cast. Flowchart 700 is suitable for use with various inheritance schemes in object-oriented programming languages.

Step 702 receives parameters for this dynamic cross cast operation by receiving an object pointer having a type corresponding to the static type of the object, a unique identifier for the static type, and a unique identifier for the target type. In one embodiment of the invention, the unique identifiers for the static and target types are accessed through pointers to the respective RTTI data structures for these types. Step 704 accesses the virtual table associated with the static type object pointer and saves the offset from that virtual table for later use. Using the example of FIG. 4, if B Object 204 is referenced through an A2 object pointer that points to the beginning of the A2 sub-object 208 (that is, the static type is A2), then virtual table 224 is accessed in step 604 and offset 228 (having a value of 10) is saved for later use.

Step 706 accesses the RTTI data structure associated with the object by using the virtual table. Continuing with the example above, if B object 204 is accessed via an A2 pointer, then RTTI pointer 226 of virtual table 224 is used to reference RTTI data structure 216. Step 707 searches the base class table for a matching entry having the same unique identifier as the static type identifier and that also matches the offset saved from the virtual table in step 704. Step 708 continues searching through the base class table from the point reached in step 707 for a matching entry having the same unique identifier as the target type identifier. In step 710, if no matches are found or if two matches are found, then the cast fails in step 712 and the flowchart ends.

In step 714 if only a single match is found then the cross cast is successful. Step 716 converts the static type object pointer into an object pointer of the target type by subtracting the saved offset from the original object pointer and then adding the offset associated with the target type in the base class table. For example, using the example of FIG. 4, if the pointer is of type A1 and the target type is of class A2, then the saved offset has a value of zero and the offset associated with the target type (which in this case is of class A2) has a value of 10. Subtracting the saved offset from the object pointer produces the beginning of the B object, which when added to the offset 10 of the target type yields a pointer pointing to the beginning of the A2 object. This A2 object pointer is the desired result. In this fashion, the RTTI data structure associated with the object is used to assist in performing a cross cast operation. Again, use of offsets in this way provides for a simple and efficient algorithm.

COMPUTER SYSTEM EMBODIMENT

Figure 10:
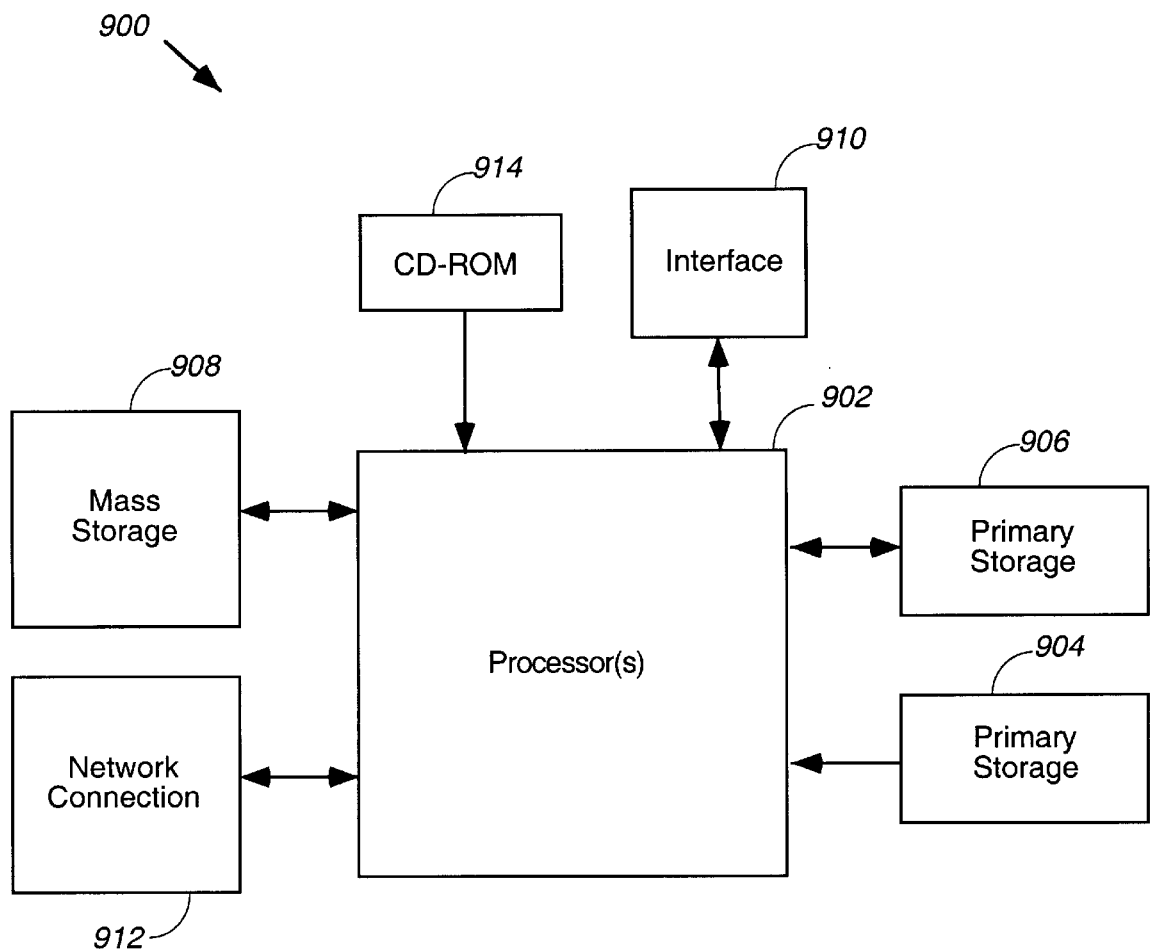
FIG. 10 is a block diagram of a typical computer system suitable for implementing an embodiment of the present invention.

FIG. 10 illustrates a computer system 900 suitable for implementing an embodiment of the present invention. Computer system 900 includes any number of processors 902 (also referred to as central processing units, or CPUs) that are coupled to storage devices including primary storage 906 (such as random access memory, or RAM) and primary storage 904 (such as a read only memory, or ROM). As is well known in the art, primary storage 904 acts to transfer data and instructions uni-directionally to the CPU and primary storage 906 is used typically to transfer data and instructions in a bi-directional manner. Both of these primary storage devices may include any suitable of the computer-readable media described below. A mass storage device 908 is also coupled bi-directionally to CPU 902 and provides additional data storage capacity and may also include any of the computer-readable media described below. Mass storage device 908 may be used to store programs, data and the like and is typically a secondary storage medium (such as a hard disk) that is slower than primary storage. It will be appreciated that the information retained within mass storage device 908, may, in appropriate cases, be incorporated in standard fashion as part of primary storage 906 as virtual memory. A specific mass storage device such as a CD-ROM 914 passes data uni-directionally to the CPU.

CPU 902 is also coupled to an interface 910 that includes one or more input/output devices such as such as video monitors, track balls, mice, keyboards, microphones, touch-sensitive displays, transducer card readers, magnetic or paper tape readers, tablets, styluses, voice or handwriting recognizers, biometrics readers, or other computers. CPU 902 optionally may be coupled to another computer or telecommunications network using a network connection as shown generally at 912. With such a network connection, it is contemplated that the CPU might receive information from the network, or might output information to the network in the course of performing the above-described method steps. Furthermore, method embodiments of the present invention may execute solely upon CPU 902 or may execute over a network connection such as the Internet in conjunction with a remote CPU that shares a portion of the processing.

In addition, embodiments of the present invention further relate to computer storage products with a computer readable medium that have program code thereon for performing various computer-implemented operations. The media and program code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. For instance, the present invention is applicable not only to the C++ programming language, but to other languages that may use similar inheritance schemes. And although "nonvirtual" inheritance has been discussed in particular, any language with an inheritance scheme that allows multiple sub-objects of the same class within an object can benefit from the present invention. Furthermore, the RTTI data structures described may be constructed and referenced in a variety of ways. Any suitable technique for associating such an RTTI structure with an object description or a class may be used.

In addition, the unique identifier and base class table may be represented and accessed within the RTTI structure in many ways. Also, the down cast operations described may be performed separately or combined into one procedure. Therefore, the described embodiments should be taken as illustrative and not restrictive, and the invention should not be limited to the details given herein but should be defined by the following claims and their full scope of equivalents.

We claim:

1. A computer-implemented method of performing a dynamic cast operation for an object-oriented program at run time, said method comprising:

receiving an object pointer of a static type that points to an object having a dynamic type;

receiving a target type to which said static type is to be cast;

determining an object pointer offset associated with said object pointer indicative of the location pointed to within said object by said object pointer;

determining a target offset associated with said target type indicative of the location of a target type sub-object within said object; and combining the value of said object pointer with said object pointer offset and said target offset to produce an adjusted object pointer, said adjusted object pointer being of said target type, whereby said dynamic cast operation is performed by the adjustment of said object pointer.

2. A method as recited in claim 1 wherein said object-oriented program includes a plurality of classes each having a class identifier, and said step of determining a target offset includes the sub-step of:

searching a subset of said class identifiers associated with said object using an algorithm that varies linearly with the number of classes in said object-oriented program, whereby said method may be performed faster.

3. A method as recited in claim 1 wherein said object-oriented program includes a plurality of classes each having a class identifier and allows nonvirtual inheritance, and said step of determining a target offset includes the sub-steps of:

searching a subset of said class identifiers associated with said object for a first entry matching said static type and having the same offset as said object pointer offset; and searching from said first entry in said subset of said class identifiers for a second entry matching said target type, whereby said dynamic cast operation operates correctly when nonvirtual inheritance is used in association with said object.

4. A method as recited in claim 1 wherein said object-oriented program allows both nonvirtual inheritance and virtual inheritance and wherein said dynamic cast operation operates correctly when nonvirtual inheritance and virtual inheritance are used in association with said object.

5. A computer-implemented method of generating a run time type identification (RTTI) data structure for an object description of a class for use at run time in an object-oriented program to assist in performing a dynamic cast operation, said method comprising:

determining an offset for each sub-object within said object description;

storing each offset for each sub-object with a virtual table corresponding to said each sub-object;

generating a unique identifier for said class and associating said unique identifier with said RTTI data structure;

determining a unique sub-object identifier for each sub-object within said object description;

storing each of said sub-object identifiers in association with said RTTI data structure; and storing each of said offsets with its corresponding sub-object identifier in association with said RTTI data structure, whereby at run time a single one of said offsets stored with one of said virtual tables may be combined with a single one of said offsets stored in said RTTI data structure to adjust an object pointer that points to an object of said class to assist in performing said dynamic cast operation.

6. A method as recited in claim 5 wherein said object-oriented program includes a plurality of classes in a class hierarchy, and wherein said class is a member of said class hierarchy and is associated with a number of base classes, said method further comprising:

stepping through said base classes of said class to determine said sub-objects;

determining whether a found base class has already been encountered; and wherein when it is determined that said found base class has already been encountered, said method includes skipping over said found base class, whereby said dynamic cast operation used at run time varies linearly with the number of classes in said class hierarchy.

7. A method as recited in claim 5 wherein said object-oriented program allows both nonvirtual inheritance and virtual inheritance and wherein said generated RTTI data structure is arranged to allow said dynamic cast operation to operate correctly when nonvirtual inheritance and virtual inheritance are used in association with said object.

8. A computer-implemented method of generating a run time type identification (RTTI) data structure for an object description of a class for use at run time in an object-oriented program to assist in performing a dynamic cast operation, said method comprising:

generating a list of sub-objects within said object description based upon base classes of said class;

skipping duplicate virtual base classes such that for each virtual base class there is only a single corresponding sub-object within said object description;

generating said RTTI data structure for said object description, said RTTI data structure including a unique identifier for said class, said list of sub-objects, and an offset for each sub-object indicating the location of each sub-object within said object description; and creating a pointer associated with each sub-object to said RTTI data structure, whereby at run time an offset of one of said sub-objects may be combined with a single one of said offsets stored in said RTTI data structure to adjust an object pointer that points to an object of said class to assist in performing said dynamic cast operation.

9. A method as recited in claim 8 wherein said object-oriented program includes a plurality of classes in a class hierarchy, and wherein said class is a member of said class hierarchy, and wherein said dynamic cast operation used at run time varies linearly with the number of classes in said class hierarchy.

10. A method as recited in claim 8 wherein said object-oriented program allows both nonvirtual inheritance and virtual inheritance and wherein said generated RTTI data structure is arranged to allow said dynamic cast operation to operate correctly when nonvirtual inheritance and virtual inheritance are used in association with said object.

11. A run time type identification (RTTI) data structure embodied in a computer-readable medium, said RTTI data structure comprising:

a unique identifier identifying the most derived base class of an object description to which said RTTI data structure corresponds, said most derived base class being part of a class hierarchy of a plurality of classes;

a list of unique identifiers corresponding to classes within said class hierarchy from which said most derived base class is derived, such that for each virtual base class from which said most derived base class is derived there is a single unique identifier in said list; and an offset for each of said unique identifiers, each offset representing the location within said object description of a sub-object corresponding to one of said classes from which said most derived base class is derived, whereby said list may be searched at run time to produce a single one of said offsets to be used in adjusting an object pointer that points to said object description to perform a dynamic cast operation.

12. A computer-implemented method of performing a dynamic down cast operation for an object-oriented program at run time, said method comprising:

receiving an object pointer of a static type that points to an object having a dynamic type, said static type being a nonvirtual base class of said object;

receiving a target type to which said static type is to be cast;

determining an object pointer offset associated with said object pointer indicative of the location pointed to within said object by said object pointer;

searching a list of base classes of said object to find a first matching entry for said static type that is associated with an offset entry that matches said object pointer offset;

searching said list of base classes beginning from said first matching entry to find a second matching entry that matches said target type, said second matching entry being associated with a target offset, said target offset indicative of the location of a target type sub-object within said object; and combining the value of said object pointer with said object pointer offset and said target offset to produce an adjusted object pointer, said adjusted object pointer being of said target type, whereby said dynamic down cast operation is performed by the adjustment of said object pointer.

13. A method as recited in claim 12 wherein said object-oriented program includes a plurality of classes each having a class identifier, and said step of searching said list of base classes beginning from said first matching entry includes the sub-step of:

searching a subset of said class identifiers associated with said object using an algorithm that varies linearly with the number of classes in said object-oriented program, whereby said method may be performed faster.

14. A method as recited in claim 12 wherein for any duplicate base classes of said object there exists a separate sub-object for each of said duplicate base classes.

15. A computer-implemented method of performing a dynamic down cast operation for an object-oriented program at run time, said object-oriented program including a plurality of virtual classes and a plurality of nonvirtual classes, and each class having a class identifier, aid method comprising:

receiving an object pointer of a static type that points to an object having a dynamic type, said static type being a virtual base class of said object;

receiving a target type to which said static type is to be cast;

determining an object pointer offset associated with said object pointer indicative of the location pointed to within said object by said object pointer;

searching a list of base classes of said object to find a first matching entry for said static type that is associated with an offset entry that matches said object pointer offset;

searching said list of base classes beginning from said first matching entry to find a second matching entry that matches said target type, said second matching entry being associated with a target offset, said target offset indicative of the location of a target type sub-object within said object; and determining the number of entries matching said target type, wherein when it is determined that zero or two entries match said target type, said method includes failing said dynamic down cast operation, and wherein when it is determined that only one entry matches said target type, said method includes combining the value of said object pointer with said object pointer offset and said target offset to produce an adjusted object pointer, said adjusted object pointer being of said target type, whereby said dynamic down cast operation is performed by the adjustment of said object pointer.

16. A method as recited in claim 15 wherein said step of searching said list of base classes beginning from said first matching entry includes the sub-step of:

searching a subset of said class identifiers associated with said object using an algorithm that varies linearly with the number of classes in said object-oriented program, whereby said method may be performed faster.

17. A method as recited in claim 15 wherein for any duplicate nonvirtual base classes of said object there exists a separate sub-object for each of said duplicate nonvirtual base classes, and wherein for any duplicate virtual base classes of said object there exists a single sub-object for each of said duplicate virtual base classes.

* * * * *